Oct. 10, 1961 L. PÉRAS 3,004,195
ELECTROMAGNETS
Filed Aug. 4, 1958
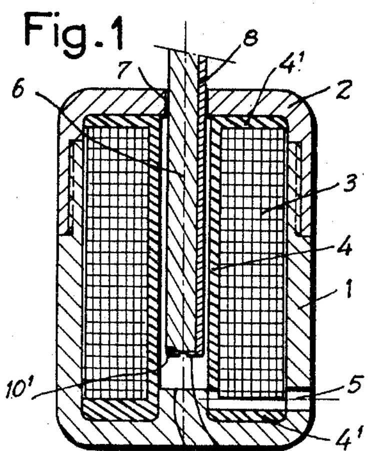
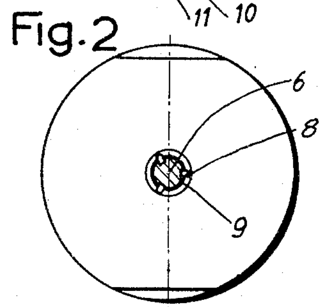
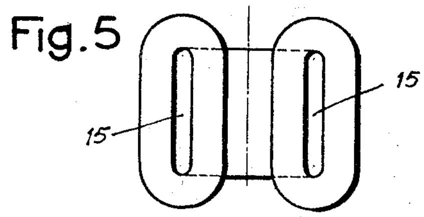
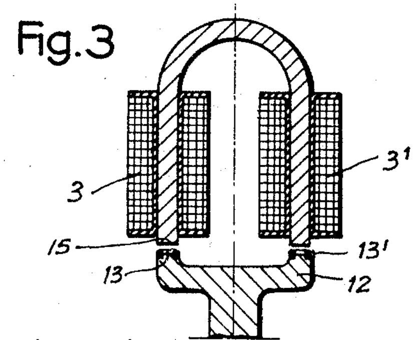
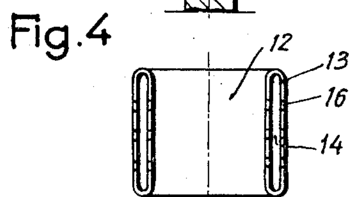
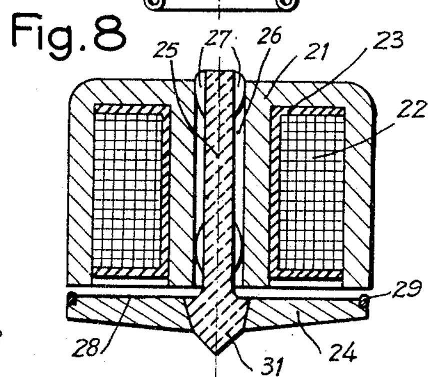
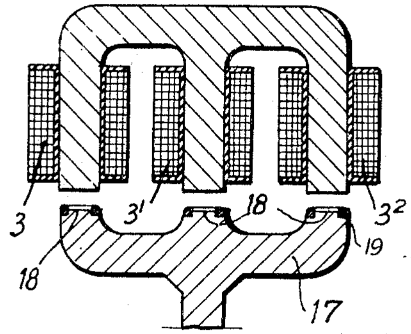
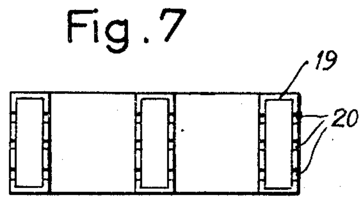
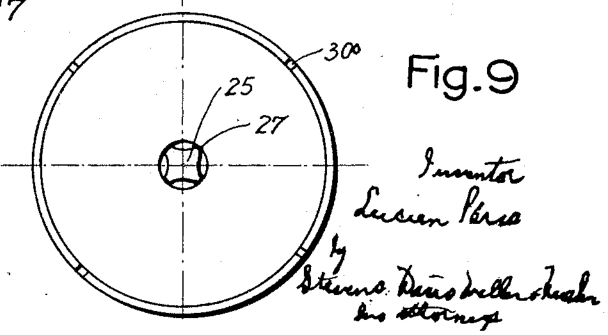
Inventor
Lucien Péras
by
Stevens, Davis, Miller & Mosher
his attorneys United States Patent Office 3,004,195
Patented Oct. 10, 1961

3,004,195

ELECTROMAGNETS

Lucien Péras, Billancourt, France, assignor to Regie Nationale des Usines Renault, Billancourt, France Filed Aug. 4, 1958, Ser. No. 752,929
Claims priority, application France Aug. 16, 1957
6 Claims. (Cl. 317—194)

This invention relates in general to electromagnets and more particularly to improvements in electromagnet design whereby the known inconveniences of residual magnetization are eliminated in a simple and efficient manner.

In spite of the cares brought in the manufacture of electromagnets, in many cases a faulty operation is observed because the movable element attracted by the electromagnet remains stuck to the core after the supply of current has been discontinued, instead of moving away therefrom under the influence of the force provided to this end, for example by gravity, spring action or any other means.

If the return force is relatively great, the sticking is obviously not so likely to take place. This is actually the case in large apparatus designed for braking, locking, hoisting and like applications. On the contrary, when the forces involved are relatively low, the attraction resulting from the residual magnetism may be preponderant and the electromagnet remains stuck.

The consequence of this electromagnet failure, whereby a controlled movement may be stopped unexpectedly, may be extremely serious in certain cases and it is evident that the complete suppression of this risk from the operation of electromagnets would constitute an appreciable additional safety factor.

Now it is the object of this invention to provide an efficient and simple solution to this problem which, by counteracting any tendency of the electromagnet to sticking, facilitates the separation of the elements in physical contact immediately as the current supply is discontinued.

To this end, the invention consists essentially in providing on the movable element or core of the electromagnet a plastic lining comprising a thin film covering the surface thereof, this lining being formed with a peripheral bead or like projection acting like a spring, as will be made clear presently.

As a matter of fact, this bead will be compressed by the attractive force of the electromagnet so that when the latter becomes de-energized the bead will expand and sharply repel the movable element or core, thus preventing any undue sticking thereof.

The presence of this plastic film increases very slightly the magnetic gap but this is not detrimental as at the end of the attraction stroke the resistant effort is generally lower while on the contrary the attractive force is maximum.

This invention is also concerned with a specific form of embodiment of electromagnets adapted more particularly for use as a valve.

The characteristic features and advantages of the invention will appear more clearly if reference is made to the accompanying drawing part of this specification and illustrating diagrammatically by way of example a few typical forms of embodiment of the invention. In the drawing:

FIGURE 1 is a vertical section showing a single-coil electromagnet;

FIGURE 2 is a plane view of the same electromagnet with a horizontal section of the core;

FIGURE 3 is a vertical section showing a two-coiled electromagnet;

FIGURE 4 is a plane view of the movable element of the electromagnet shown in FIG. 3;

FIGURE 5 is a plane view from below of the electromagnet shown in FIG. 3, but with the movable element removed therefrom;

FIGURE 6 is a vertical section showing a three-coiled electromagnet;

FIGURE 7 is a plane view showing separately the movable element of the electromagnet shown in FIG. 6;

FIGURE 8 is a vertical section illustrating a single-coil electromagnet having a movable element consisting of a metal disc having a guiding shank of plastic, non-magnetic material, and FIGURE 9 is a plane view from above of the electromagnet of FIG. 8.

Referring to FIG. 1, the reference numerals 1 and 2 denote the two essential component elements of the electromagnet core which in this form of embodiment are assembled by screwing, it being understood that any other method of assembling, for example by plain fitting, may be used.

The electromagnet coil 3 is mounted in a tubular support 4 of plastic material formed with integral insulating end flanges 4[1].

The support is formed with an orifice 5 for the passage of the coil wires.

The electromagnet further comprises a soft-iron plunger 6 slidably mounted in the bore 7 of the core and also in the tubular portion of support 4.

Longitudinal strips 8 of plastic material are inserted in grooves formed in the plunger 6 to guide same while insulating it from the core.

An elastic film 9 covers the plunger 6 and interconnects the longitudinal strips 8 so as to form therewith a continuous lining or sheath.

The plunger 6 is provided at its inner end with a lining 10 comprising a thin film and a bead 10[1] adapted to contact the base 11 of the core.

Transverse grooves are formed in the bead 10[1] to avoid any suction effect.

The operation of this electromagnet is the same as that of similar devices; the plunger 6 is normally urged away from the base 11 of the core (position shown in FIG. 1) by adequate means and when current is supplied to the coil winding the plunger 6 is attracted within the core until the bead 10[1] of lining 10 contacts the base 11.

Due to the presence of the lining 10 and bead 10[1], a certain minimum magnetic gap is maintained to limit the magnetization value.

When the coil is de-energized, the attraction ceases and the plunger 6 is released. This release is promoted and accelerated by the elastic force accumulated or stored up in the lining 10 and bead 10[1] previously compressed by the magnetomotive force and now allowed to expand, thereby repelling the plunger. Under these conditions, it is evident that any risk of sticking is eliminated.

FIGURES 3, 4 and 5 show an electromagnet having two coils 3, 3[1] of which the movable element 12 is provided with the lining 13 and bead 13[1] of this invention which surrounds the face 14 thereof.

Thus,, as in the case shown in FIG. 1, a magnetic gap is formed to retard the magnetization and set it to a predetermined maximum value, the bead 13[1] of this lining promoting and accelerating the movement of the member 12 away from the end 15 when the energizing current is cut off.

As shown in FIG. 4, notches 16 are formed in the bead of lining 13 to prevent, as in the preceding case, the suction effect which would certainly take place when the lining is being compressed, and would counteract the movement of the movable element away from the ends 15 of the core.

In the modified form of embodiment shown in FIGS. 6 and 7, a three-coiled electromagnet 3, $3^1$, $3^2$ is provided which operates exactly like the device of FIG. 3.

Thus, the movable element 17 is provided with contact faces 18 and with a gap-forming lining 19 of which a bead formed with notches 20 is in integral part.

The reference numeral 21 denotes the yoke surrounding a coil 22 mounted in a plastic support 23 similar to that of the coils illustrated in the preceding figures. The movable element consists in this case of a disc of magnetic metal 24 carried by the shank 25 of plastic material molded in the disc 24 so as to form an integral part thereof. The shank 25 is guided in the bore 28 of yoke 21 by fins 27. The inner face of the disc 24 is covered by the plastic contact lining comprising the thin film 28 and the circular bead 29, as well as the notches 30 avoiding the suction effect.

This form of embodiment is characterized by several remarkable features; thus, the shank of plastic material will not become magnetized and therefore any remanence or residual magnetization is avoided as compared with construction utilizing magnetic metals.

In addition, this shank is flexible and will not break. The displacement of the movable member, in this case the disc 24, is particularly easy due to the remarkable flexibility of this member.

The action exerted by the magnetic flux is promoted by the considerable relative dimensions of the electromagnet core of which the attractive force exerted on the disc 24 is very considerable.

Finally, the plastic lining covering the disc 24 is characterized by the additional advantage that its two-fold action will on the one hand retard slightly the attraction of the electromagnet during the final phase of the movement of disc 24, due to the thin magnetic gap maintained by this lining, and on the other hand fastly repel the disc when the coil is de-energized, due to the expansion of the previously compressed elastic bead.

The bead of the plastic linings, which constitutes one of the essential features of this invention, is shown in the various forms of embodiment as being located around the periphery of the movable element of the electromagnet. However, the shape of this bead may be modified as desired or required; thus, a cross-shaped, rectilinear or otherwise positioned bead may be provided, another alternative consisting in providing the bead on the cores of the electromagnets, or even on both cores and movable elements at the same time.

In the specific form of embodiment illustrated in FIG. 8, the movable element 24 is a valve having a valve member 31 adapted to close or open an aperture in a seat (not shown).

I claim:

1. In an electromagnet which comprises two relatively movable elements arranged in reciprocal relationship and constituted of a magnetic metal, with a coil mounted on one of the two elements, the two elements comprising cooperating surfaces that are attracted and stuck against each other when an electric current passes through said coil, the improvement comprising the provision of a lining of plastic material on one of said surfaces and formed with at least one elastic bead which acts as a spring to maintain a slight magnetic gap and prevent the elements from sticking to each other after the electromagnet has been de-energized.

2. The combination of claim 1, wherein said elastic bead is formed with notches to avoid a suction effect when the surfaces are brought into engagement.

3. The combination of claim 2, wherein a resilient bead is provided on the film at the outer end of the plunger and is formed with notches.

4. The combination of claim 1, wherein one of the elements is a disc of magnetic material integral at its center with the end of a plunger of plastic material and being perpendicular to the axis of said plunger, the other element being pot-shaped and containing the electromagnetic coil and having tubular supports carrying the coil, such supports being formed with flanges and adapted to receive the plunger having guiding ribs also of plastic material.

5. The combination of claim 4, wherein the elastic bead is formed with notches to avoid the suction effect when the faces of the pot-shaped and disc elements contact each other.

6. In an electromagnet which comprises a soft iron plunger constituting one relatively movable element and another relatively movable element which is pot-shaped and contains an electromagnetic coil and having a tubular support around which the coil is disposed, the support slidably receiving the plunger; the improvement comprising the provision of the film of plastic material on the plunger with plastic guiding ribs being provided for guiding the plunger in the support.

References Cited in the file of this patent

UNITED STATES PATENTS

| | | |
|---|---|---|
| 682,377 | Wurmb et al. | Sept. 10, 1901 |
| 1,293,052 | Dinsmoor | Feb. 4, 1919 |
| 2,163,657 | Beckman | June 27, 1939 |

FOREIGN PATENTS

| | | |
|---|---|---|
| 457,540 | Great Britain | Nov. 30, 1936 |
| 604,533 | Great Britain | July 6, 1948 |